United States Patent [19]
Kraus

[11] 3,776,120
[45] Dec. 4, 1973

[54] LARGE-PICTURE CAMERA

[76] Inventor: Warner Kraus, 31 Bauerstrasse, Munich, Germany

[22] Filed: Aug. 6, 1971

[21] Appl. No.: 169,633

[30] Foreign Application Priority Data
Aug. 7, 1970 Germany............... P 20 39 373.1

[52] U.S. Cl........................ 95/82, 355/52, 352/85
[51] Int. Cl. .......................................... G03b 15/06
[58] Field of Search .................... 95/11, 15, 70, 82; 352/85; 355/52

[56] References Cited
UNITED STATES PATENTS

| | | | |
|---|---|---|---|
| 2,664,784 | 1/1954 | Waller | 95/18 |
| 2,368,970 | 2/1945 | Cook | 95/1.1 |
| 2,061,652 | 11/1936 | DeRoode | 352/200 |
| 1,878,670 | 9/1932 | Brosse | 355/52 |
| 3,203,328 | 8/1965 | Brueggemann | 95/15 |
| 2,081,299 | 5/1937 | Hill | 352/85 |
| 188,377 | 3/1877 | Kempf | 95/70 |
| 1,895,239 | 1/1933 | Venzie | 95/82 |

Primary Examiner—John M. Horan
Attorney—George H. Spencer et al.

[57] ABSTRACT

A large-picture camera for producing a positive photographic picture of an object especially a human being, in essentially natural size, comprises means for supporting a positive photographic material at an image plane which is adjacent a pick-up area, a reflective objective constituted by a concave reflector for forming an image of the object positioned at the pick-up area in the image plane, illuminating means including at least one flashlamp arranged to illuminate the object at the pick-up area, second supporting means for adjustably supporting the reflector in opposed relationship to the pick-up area, and the adjacent first supporting means such that an object at the pick-up area is imaged by the reflective objective at the image plane. Screen means prevent any substantial amount of light stemming from the illuminating means from arriving at the image plane via any other path than via the reflective objective.

15 Claims, 8 Drawing Figures

LARGE-PICTURE CAMERA

BACKGROUND OF THE INVENTION

The present invention relates to a large-picture camera for producing positive pictures of an object, preferably of a human being in substantially natural size, with a filmholder for a positive photographic material, an objective for imaging the object placed at a pick-up point to the photographic material, and at least one flashlamp for the short-time illuminating of the object to be photographed.

Cameras for taking a positive picture of an object to be photographed within a short period of time are known. Also, it is known to provide such cameras with a flashlight. But the known cameras of this kind are not suitable for producing large-size pictures such as the so-called "posters", for which there exists a great demand at the present time.

SUMMARY OF THE INVENTION

An object of the present invention is therefore to provide a relatively inexpensive large-picture camera, by which positive pictures of a human being or another object can be made in substantially natural size.

According to an embodiment of the invention, a camera or photographic apparatus for taking large-size pictures of an object, e.g. of a human being, comprises a filmholder for a positive photographic material, an objective for imaging the human being situated at a pick-up point onto the photographic material, and at least one flashlamp for short-time illuminating of the object to be photographed. The camera or photographic apparatus is characterized in that the objective is a mirror objective comprising a concave mirror which is placed at an adjustable holding position in front of the filmholder and in front of the pick-up point provided near the film-holder. A screening wall is arranged between the filmholder and the pick-up point, and extending in the direction towards the concave mirror. The flash-lamp cs) is (are) placed in such a way that the flashlamp is shielded off by the screening wall from the photographic material.

The mentioned parts can be arranged on a platform provided with rollers, so that the whole camera can easily be moved and transported.

The picturing scale will preferably be chosen slightly smaller than 1 : 1, for instance 2 : 3, as it has shown that photographs of full scale give the impression of over life size.

The camera according to the present invention gives for the first time to the person to be photographed the opportunity to shape the picture by himself, and not just to be a passive photographic object.

BRIEF DESCRIPTION OF THE DRAWINGS

In the following some embodiments of the invention will be described with reference to the accompanying drawings.

DESCRIPTION OF THE PREFERRED EMBODIMENTS

Figure 1:
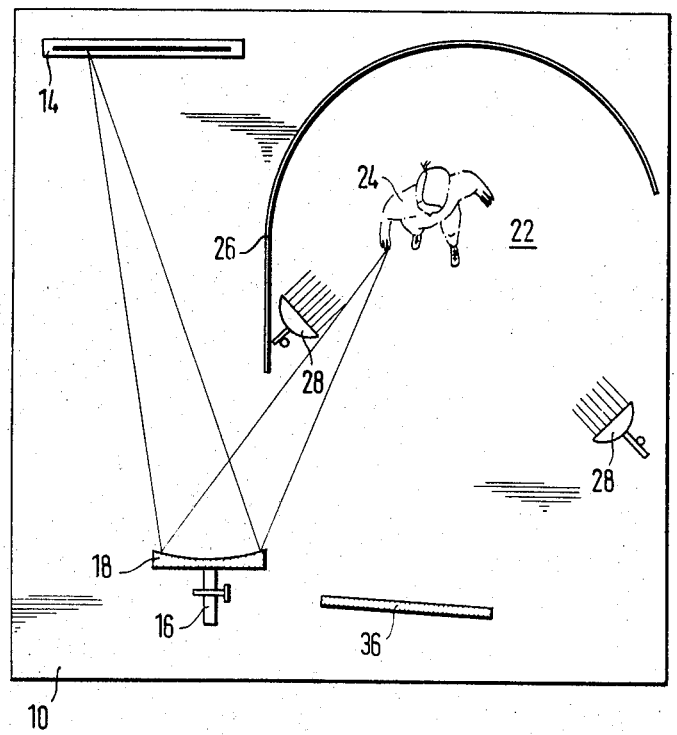
FIG. 1 is a schematic top plan-view of a large-picture camera, in accordance with one embodiment of the present invention.
Figure 2:
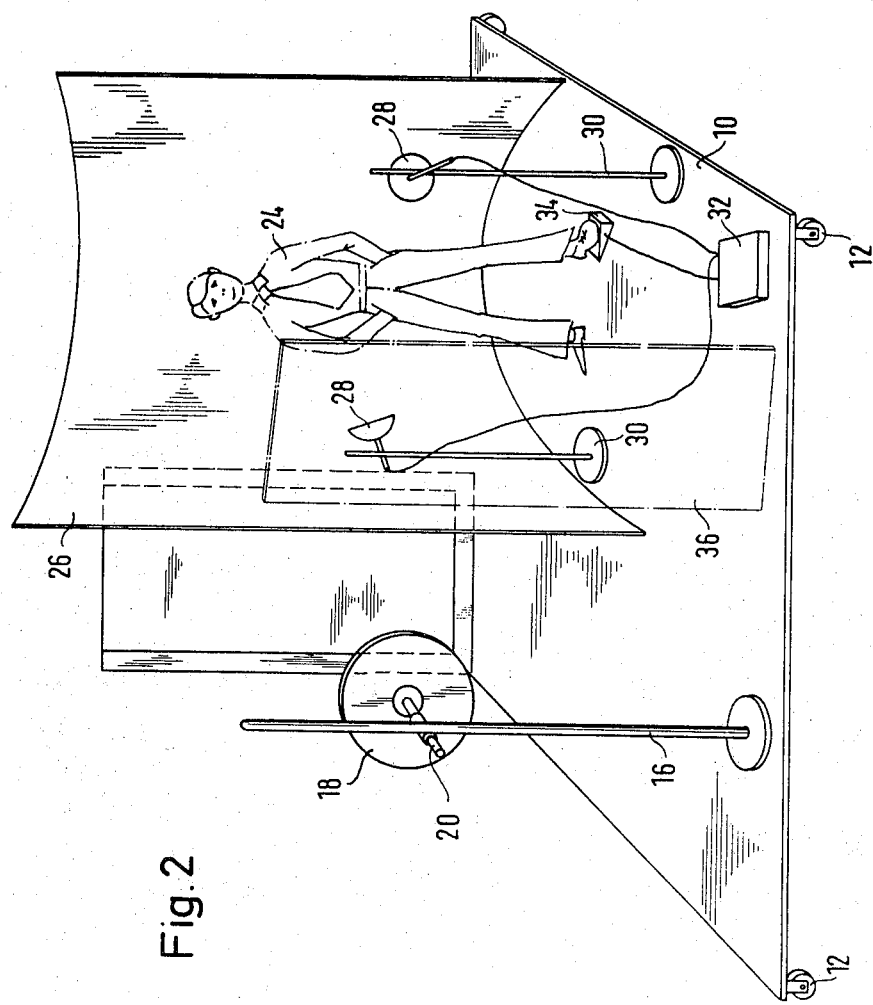
FIG. 2 is a simplified perspective view of the large-picture camera according to FIG. 1.

The embodiment of the large-picture camera represented schematically in FIGS. 1 and 2, comprises a platform 10, which is preferably provided with rollers, so that the whole camera can be easily moved in a studio. A filmholder 14 for a positive photographic material is positioned at the back-part of the platform 10 on the left side (as seen in FIG. 1). Preferably, a positive paper with silver-diffusion-coating will be used for photographic material, which is a commercial product delivering directly positive usable pictures. The dimensions of the filmholder could, for example, be 1 × 2 meters, so that a sheet of paper can be fixed, which permits taking a photographic picture of a human being in essentially natural size. A stand (tripod) 16 is provided at the front part of the platform 10, and supports a concave mirror or reflector 18 serving as a photographic objective. A fixture 20 of the concave reflector — shown only schematically — permits preferably tipping of the concave reflector around two axes as well as a movability of the concave reflector in the direction of the filmholder 14.

A screening wall 26 is provided between the pickup point 22, which is provided at the right rearward part of the platform 10 where the person 24 to be photographed is located during taking, of the photograph and the film-holder 14. The wall 26 must, of course, not hinder the path of rays between the person 24, and the filmholder 14. The wall 26 is constructed such that it shields off the light radiated by a preferably pair of flashlamps 28 and permits illuminating the person 24 to be photographed with the photographic material in the filmholder 14. The screening wall 26 is preferably, as represented, bent into a partially U-shape and can serve in a well known manner as a background mockup.

The flashlamps 28 are adjustably supported by stands 30, which in turn are preferably fixed to the platform 10. The flashlamps 28 are connected to a normal electronic flash equipment 32, which can be released by a trigger mechanism at the pick-up point 22, preferably by a foot switch 34 actuated by the person to be photographed itself. Beside the mirror 18 serving as photographic objective, a plane control mirror 36 is provided in this embodiment — represented only by dotted lines in FIG. 2 — which permits a control by the person to be photographed of the picture which is projected onto the photographic material.

The flashlamps 28 preferably are combined with additional light sources, for instance electric bulbs, which render possible the focusing of the camera before taking the photograph. Either of these bulbs can give off, for example, red light to which the photographic material is not sensitive. Alternatively a color filter (not shown) can be hinged in front of the concave reflector 18 which prevents a pre-exposure of the photographic material.

The function of the shutter of the described camera will be assumed by the flashlamps.

Figure 3:
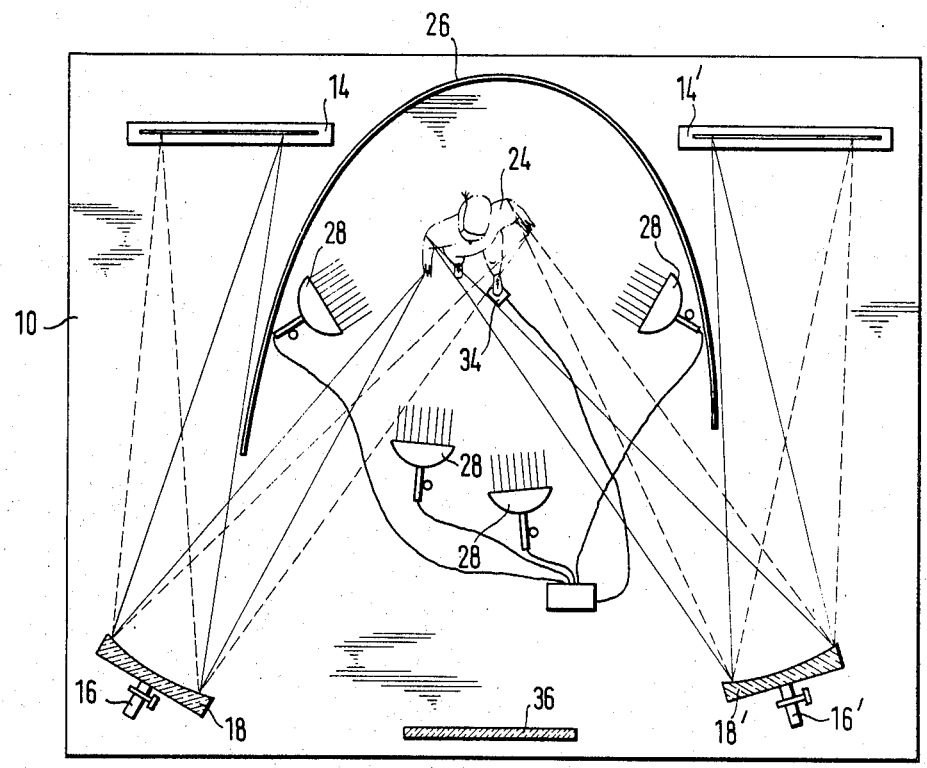
FIG. 3 is a simplified schematic representation of another embodiment of a large-picture camera in accordance with the present invention.

Another embodiment of the present invention, represented in plan view in FIG. 3, differs from the embodiment according to FIGS. 1 and 2 mainly because it is provided with two filmholders 14, 14' and two concave reflectors 18m 18'. The two concave reflectors 18, 18' are arranged so that at an appropriate position of the person 24 to be photographed, a frontal picture is projected onto the photographic material supported by the filmholder, preferably the filmholder 14', and a profile picture will be produced on the photographic material supported by the other filmholder, preferably the filmholder 14. The screening wall 26 is in this case U-shaped, so that both filmholders 14 and 14' are screened against the light of the flashlamps 28, which are mainly arranged within the space encircled by the U-shaped screening wall 26 on the platform 10. In other respects, the embodiment of FIG. 3 is similar to that of FIGS. 1 and 2 and like reference numbers have been used for corresponding parts.

The term "filmholder" should be understood in its broadest sense and comprehend all installations or means which are suitable to hold the photographic material during the exposure and preferably also during the subsequent processing, including drying after development. Thus, the filmholder can, for example, comprise an open-structured frame or a perforated plate, on which the photographic material is fixed by clamps.

Figure 4:
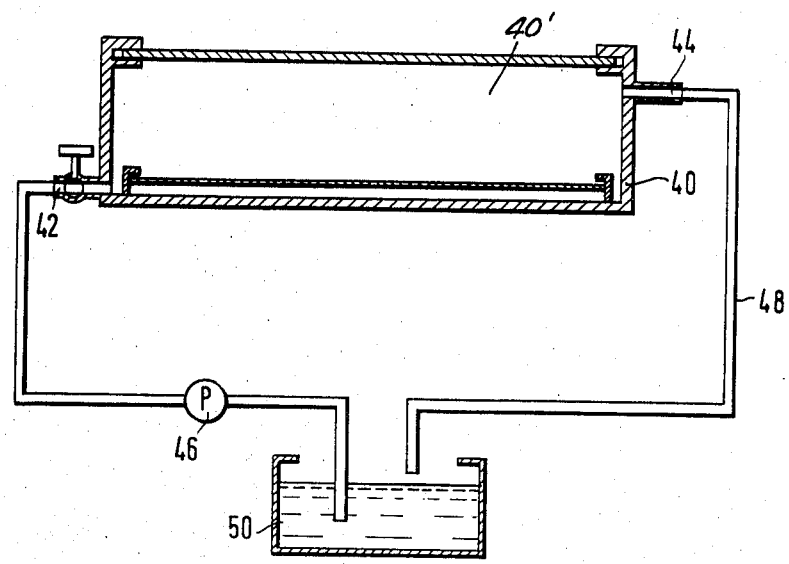
FIG. 4 is a schematic representation of a film-holder for use in a large-picture camera in accordance with the present invention.

Preferably the filmholder is constructed to serve also as a trough for the subsequent development, fixing, and washing of the photographic material. In this case, the filmholder can, for example, comprise several plastic plates connected by fusing or welding and forming a shallow liquid-impervious box 40 (FIG. 4), which can be closed and lighttight in the usual way by a shutter or the like (not shown). The box 40 is provided with two fittings 42, 44 which can be connected to pipelines, which for example, lead to the discharge side of a pump 46 and to a return pipe 48 respectively. During the processing, for example, developer can be pumped by the pump 46 from a stock bin 50 into the trough 40' formed by the filmholder. The treatment liquid will then flow back through the fitting 44 and the return pipe 48 to the stock bin 50 and will then be sucked in again by the pump 46. In this way, the photographic material can remain within the filmholder from the time of picture taking until the finished dried picture, which remarkably simplifies the photographic processing.

If a simple clamping frame or a plate is used as the filmholder, then these can be provided before and after the taking of the photograph with a slipped-over, lighttight bag, made for instance of black plastic film. In a darkroom the frame or the plate can then be hang into a trough, which contains the necessary treatment liquids.

Figure 5:
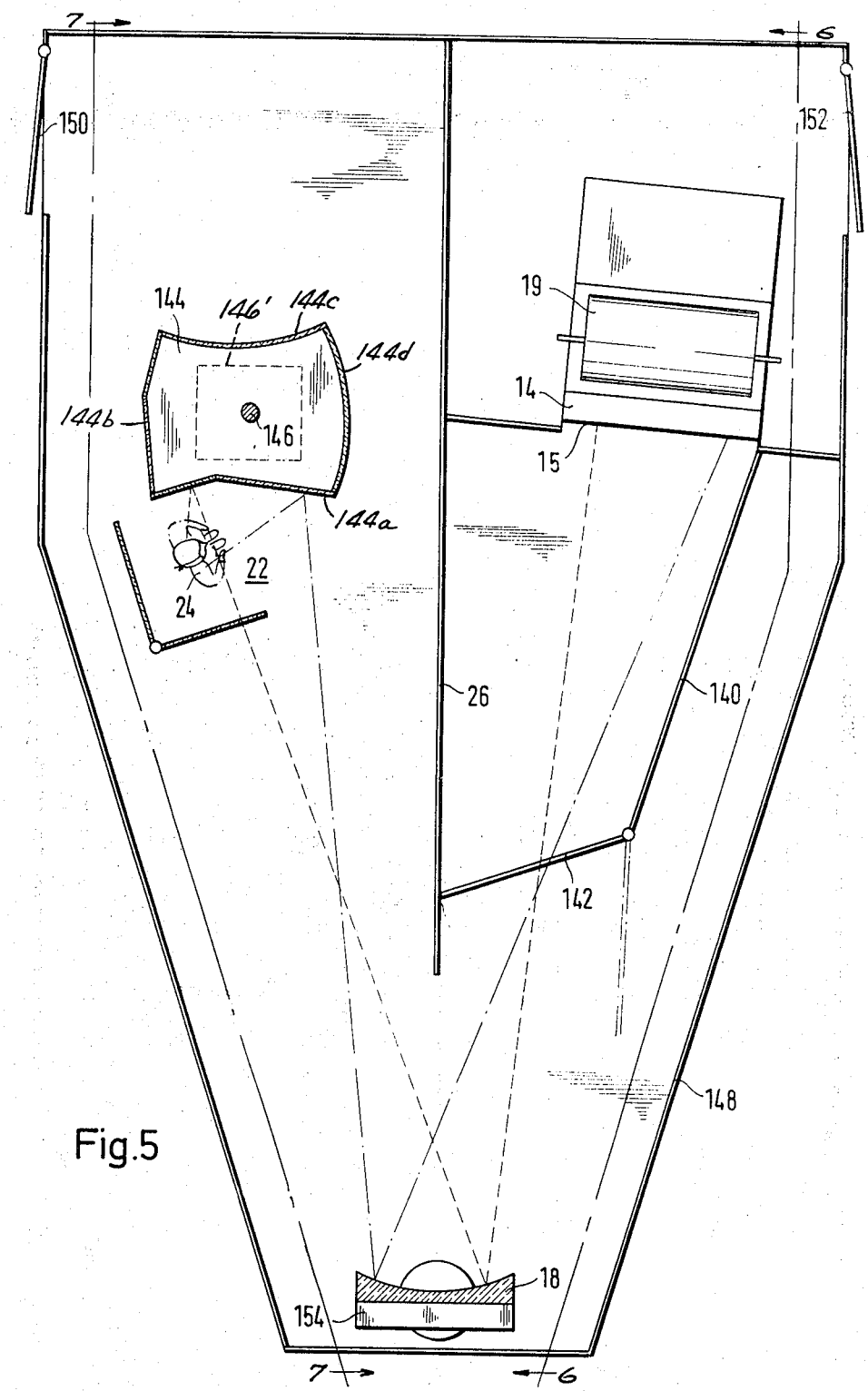
FIG. 5 is a top plan-view of a large-picture camera in accordance with still another embodiment of the present invention.
Figure 6:
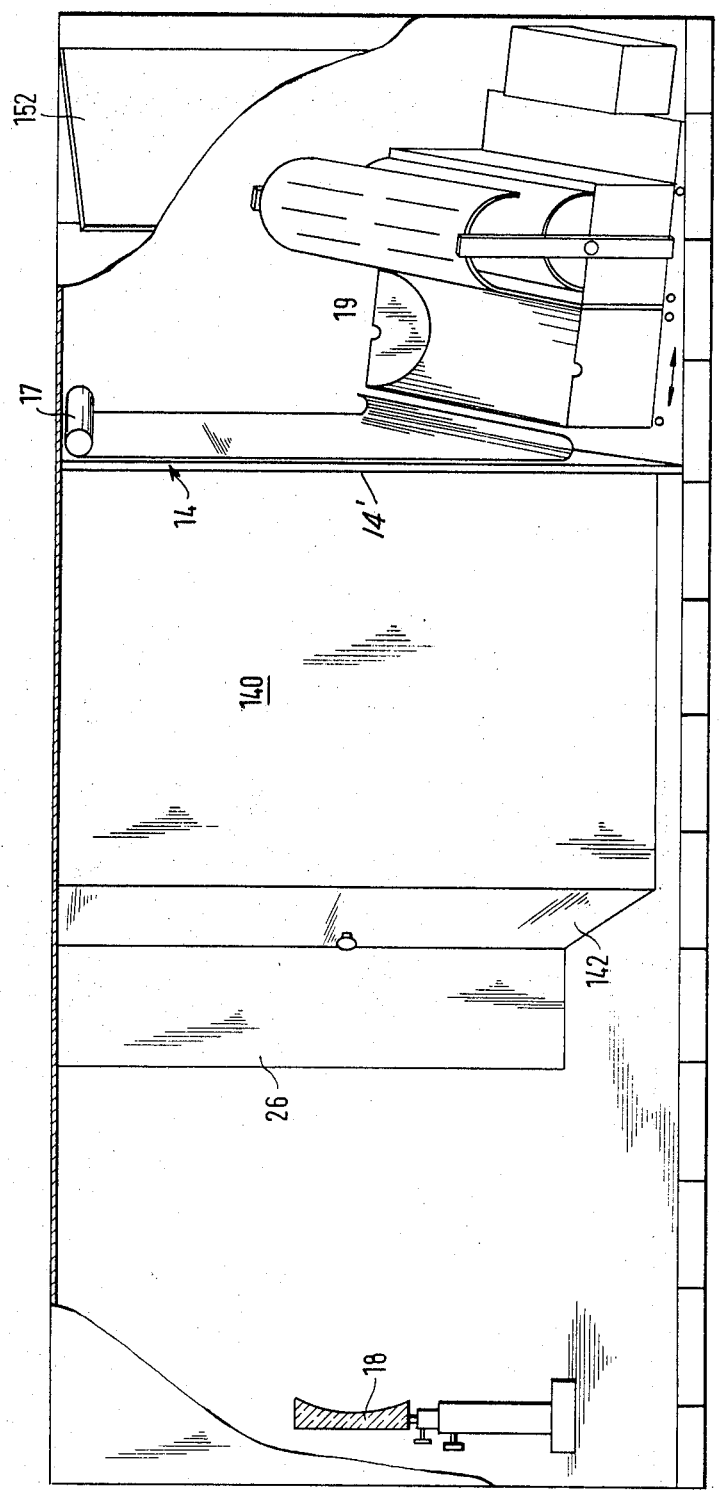
FIGS. 6 and 7 are partly sectional views in elevation of both sides of the large-picture camera in accordance with FIG. 5, viewed in the direction 6-6 and 7-7 of FIG. 5 respectively.
Figure 7:
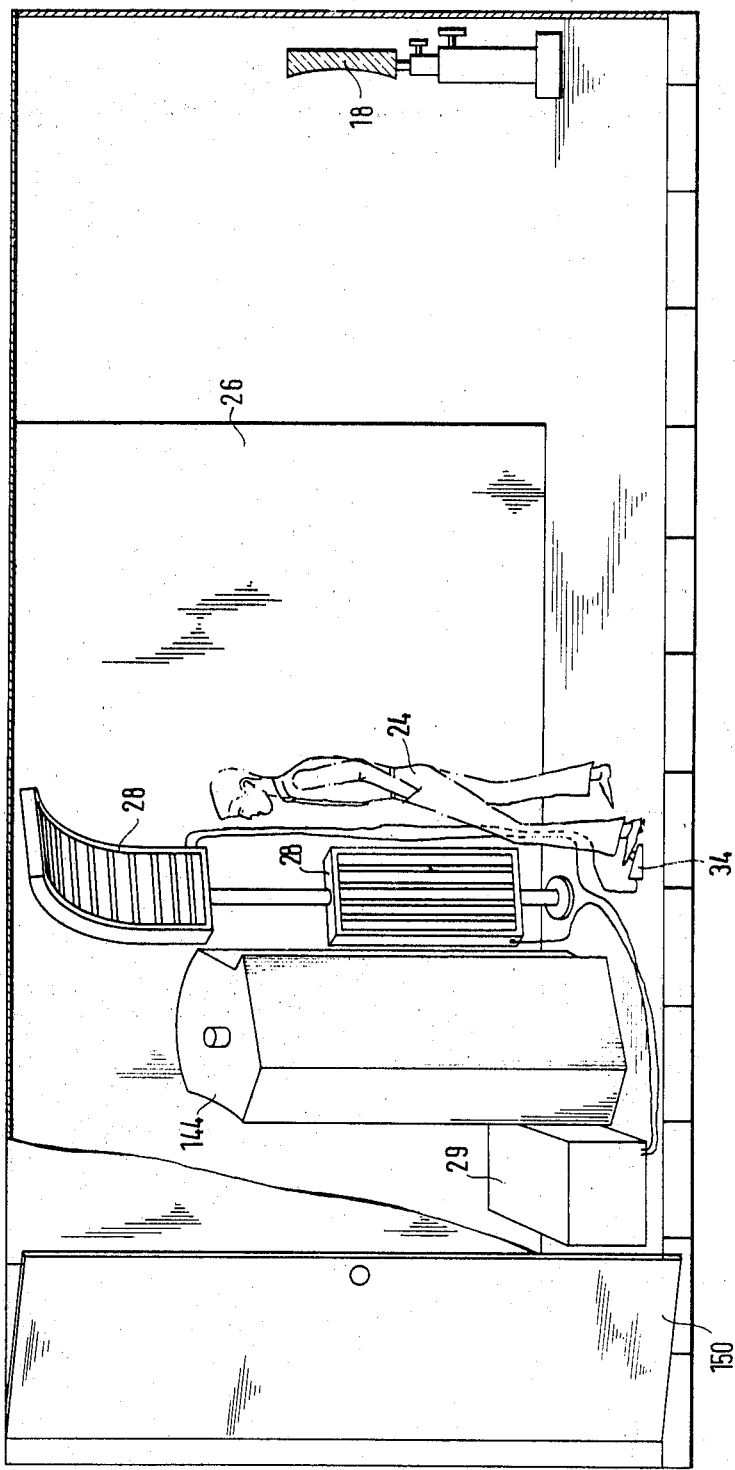

The embodiment represented in FIGS. 5,6 and 7 also comprises a concave mirror 18 serving as an objective, which images a person 24 placed at the pick-up point 22 on a film 15, which in turn is fixed to a filmholder 14. The filmholder 14 here consists of an upright frame 14', on the top of which is a bin for a stock paper roll 17, from which a piece of paper of the required length can be pulled down and brought into the picture taking position when necessary. Behind the filmholder 14, which serves as a paper-holder, there is situated development equipment 19, which can be constructed in a usual way to contain a trough for the treatment of the photographic paper as well as a drying plant.

The space in front of the filmholder 14 is closed lighttight by a wall 140 and can be entered through a door 142 which also serves as a shutter.

In the embodiment shown in FIGS. 5 to 7 the light from the person 24 to be photographed 24 is not received directly by the concave reflector 18 but rather via a reflector column 144. The column 144 is rotatably supported on a vertical axle 146 and is rotated around the axle 146 by moving means 146'. The column 144 has at least two reflecting surfaces. Preferably, as shown, the column 144 has several reflecting surfaces 146a - 146b which can be used selectively.

Initially, the reflecting column 144 is in a first index position such that the person 24 to be photographed can see himself to check the way he will be imaged on the photographic material 15. At the moment when he actuates the switch 34, door 142 is opened by an actuating device, not shown, and column 144 is rotated by the moving means 146' and by a selected angle to a second index position such that the person 24 will be imaged onto the photographic material 15 via the selected reflecting surface and the concave reflector 18.

As a result the person 24 can photograph himself and arrange the image entirely in accordance with his own desires. He can try different positions before the reflector until he has found the correct position for taking the picture, and then operate the switch 34. At the moment that switch 34 is actuated, the reflecting column 144 swings into the exposure-taking position, the door 142 opens, and then the person 24 is lighted by the flashlamps 28 and consequently photographed. All these actions are effected automatically in the right sequence by operating the switch 34 and the release mechanism.

In order to enlarge the arranging possibilities, the reflecting column 44 has a number of different taking-positions. At the taking-position represented in FIG. 5, two plane reflectors are in active position, and the person 24 is imaged by these reflectors from the front and from the side on the photographic material 15. On two side by side parts of the photographic material 15 thus a frontal and a profile image is photographed.

Other reflectors can be formed as concave, convex or in any other manner, in order to obtain a distortion or strange deformation of the image. Preferably a very slightly convex reflector is provided, which effects a slightly more slender image. In this case the result is a more natural impression as with a normal image, because of the fact that the image of an approximately cylindrical body projected on a plane always has the effect of being sceningly broader than it is observed directly.

The whole arrangement can be surrounded by walls 148, which are accessible by doors 150,152.

According to a further feature of the present invention, the concave reflector serving as objective 18 is provided with a mechanism 154 which permits a slight deformation of the reflector. As a result it is possible to bend the reflector 18 selectively slightly around a vertical or horizontal axle, such that both the imaging effect of the spherical or parabolic reflector and the distortion of a cylindrical reflector with vertical respectively horizontal axis is obtained. By this the photograph can be slightly stretched as desired in the vertical or horizontal direction. The deformation can easily be effected mechanically by remote-controlled adjusting screws or by a pneumatic or hydraulic device and can be controlled from the pick-up point 22.

As the positive photographic material is comparatively insensitive, it is necessary to illuminate the person 24 relatively strongly. In principle this is easily possible with the usual xenon flashbulbs, but then there is a risk that the eyes of the person to be photographed will be extremely dazzled if not injured. In order to avoid this, preferably several flashbulbs are used and fired in short sequence after another so that the maximum intensity of illumination will not exceed a given safe value. Instead of one single short intensive flash there will thus be a sequence of weaker flashes, the intervals between which being sufficiently long, so that their light output does not overlap at all or does overlap only with their extensions such that the illumination intensity will never be markedly greater than that of a single flashlamp.

Figure 8:
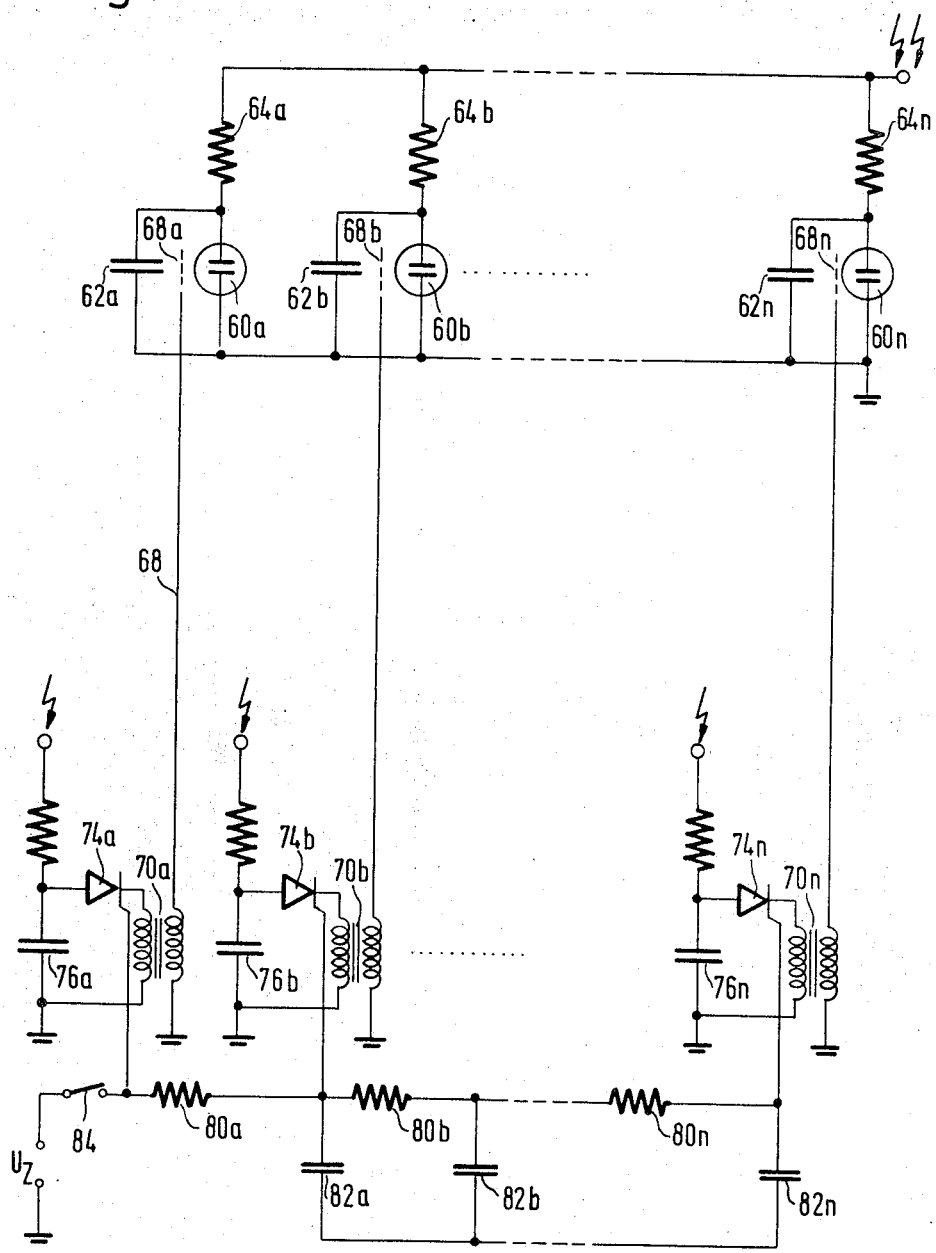
FIG. 8 is a circuit diagram of a flashlight equipment for a large-picture camera in accordance with the present invention.

FIG. 8 is a circuit which diagrammatically represents a flashlamp equipment which meets these conditions. It contains a number of flash-bulbs 60a to 60n, which may be known xenon gas discharge tubes and a discharge capacitor 62a to 62n respectively connected across each of these flashbulbs and connected by a charging resistor 64a to 64n respectively, to a high voltage source 66.

Trigger electrodes 68a to 68n of the flashbulbs are each connected to an individual ignition transformer 70a to 70n respectively, the primary of which is connected in series with an SCR or thyristor 74a to 74n across a discharge capacitor 76a to 76n respectively. The capacitors 762a to 76n are charged over a resistor by a power source (not shown). The trigger electrodes 68a to 68n of the thyristors 74a to 74n are connected to taps of a delay line which comprises series resistors 80a to 80n and parallel capacitors 82a to 82n. The trigger electrode 68a of the thyristor 74a is connected to a first end of the delay line, the trigger electrode 68b of the thyristor 74b to the connection of the resistors 80a and 80b etc., as shown in FIG. 8. The first or input end of the delay line is connected by a trigger switch 84 to a source of trigger voltage $U_z$.

The trigger switch 84 is closed by actuating the switch 34 and thus the release mechanism (in the embodiment according to FIG. 5 the closing is delayed for such a time interval, that the reflecting column 144 can move into the taking position and the door 142 can open). By the closing of the trigger switch 84 the ignition voltage is applied to the trigger or gate electrode of the thyristor 74a and the flashbulb 60a fires. After a certain interval of delay the capacitor 82a has been charged to such an extent through resistor 80a, that also the thyristor 74b and thus, the flashbulb 60b fire. In this way, correspondingly all the flashlamps 60a to 60n are fired shortly one after another. Suppose that a flash lasts for about 1 millisecond and that ten flashlamps are provided, the delay line can be adjusted, such that the series of flashes is distributed over 10 milliseconds, which amounts to an exposure time of 1/100 second. Thus acceptable instantaneous photographs are possible without the intensity of illumination reaching a dangerous value.

Various modifications and variations of the described embodiments will become obvious for those skilled in the art and will fall under the scope of the following claims.

I claim:

1. A large-picture camera for producing a positive photographic picture of an object, especially a human being, in essentially full size, comprising first means for supporting a positive photographic recording material at an image plane, a pick-up area, said pick-up area being adjacent said first supporting means, a reflective objective comprising a concave reflector for forming an image of the object positioned at said pick-up area in said image plane, illuminating means comprising at least one flashlamp arranged to illuminate said object at said pick-up area, second supporting means for adjustably supporting said reflector in opposed relationship to said pick-up area and said first supporting means such that an object at said pick-up area is imaged by said reflective objective at said image plane, screen means including a wall between said pick-up area and said first supporting means, and extending in the direction of said concave reflector so that any substantial amount of light stemming from said illuminating means arrives at said image plane via no other path than that containing said objective, and a second reflector rotatably supported about a vertical axis and provided in spaced relationship with said first supporting means and said pick-up area, said second reflector having a plurality of selectable reflective surfaces and having first and second index positions, said first index position enabling a human being to observe an image on one selective reflective surface of said second reflector similar to the image formed by said concave reflector at said image plane and the second index position enabling the subject to be imaged via another selected reflective surface and said concave reflector onto said image plane.

2. The camera as defined in claim 1, further comprising a platform provided with rollers, wherein said first and second supporting means, said screen means and said illuminating means are arranged on said platform.

3. The camera as defined in claim 1, wherein one of the reflective surfaces of said second reflector is a substantially planar reflector.

4. The camera as defined in claim 1 wherein said wall is generally U-shaped relative to a horizontal plane.

5. The camera as defined in claim 1, further comprising third supporting means for supporting a positive photographic recording material arranged on the opposite side of said pick-up area in respect to said first supporting means, and an additional reflective objective said first and third supporting means and said reflective objectives being separately arranged such that one of said objectives produces an essentially frontal picture of a human being positioned at said pick-up point at said first supporting means , and the other of said objective produces an essentially profile picture of the human being at said third supporting means.

6. The camera as defined in claim 1, further comprising release means provided at said pick-up area for actuating said illuminating means.

7. The camera as defined in claim 6, wherein said release means comprises a switch actuable by foot.

8. The camera as defined in claim 1, wherein said first supporting means includes a processing trough.

9. The camera as defined in claim 8, wherein said trough has two fittings for the supply and draining off of a processing liquid.

10. The camera as defined in claim 1, wherein said first supporting means comprises an open-structured frame adapted to support said photographic material during drying.

11. The camera as defined in claim 1, further comprising means for moving said column from said first index position into said second index position upon actuation of a release mechanism.

12. The camera as defined in claim 1, wherein said illuminating means comprise a number of gas discharge flashlamp tubes and means for firing said tubes is succession after actuation of a release mechanism.

13. The camera as defined in claim 1, further comprising fourth supporting means adapted to support a supply of photographic material adjacent said plate, and wherein said first supporting means comprises a frame for positioning said photographic material in said image plane.

14. A large-picture camera for producing a positive photographic picture of an object, especially a human being, in essentially full size, comprising first means for supporting a positive photographic recording material at an image plane, a pick-up area, said pick-up area being adjacent said first supporting means, a reflective objective comprising a concave reflector for forming an image of the object positioned at said pick-up area in said image plane, illuminating means comprising at least one flashlamp arranged to illuminate said object at said pick-up area, second supporting means for adjustably supporting said reflector in opposed relationship to said pick-up area and said first supporting means such than an object at said pick-up area is imaged by said reflective objective at said image plane, screen means including a wall between said pick-up area and said first supporting means, and extending in the direction of said concave reflector so that any substantial amount of light stemming from said illuminating means arrives at said image plane via no other path than that containing said objective, a second reflector provided in spaced relationship with said first supporting means and said pick-up area for enabling a human being to observe an image on said second reflector similar to the image formed by said concave reflector at said image plane, and an essentially light-tight compartment, said first supporting means being enclosed by said compartment, and said compartment having a door which is movable between first and second positions, the first position being such that said compartment is closed and the second position being such that light stemming from said object and reflected by said reflective objective can travel to said image plane.

15. The camera as defined in claim 1, further comprising means provided to impart to said reflector a slight cylindrical curvature.

* * * * *

UNITED STATES PATENT OFFICE
CERTIFICATE OF CORRECTION

Patent No. 3,776,120          Dated December 4th, 1973

Inventor(s) Werner Kraus

It is certified that error appears in the above-identified patent and that said Letters Patent are hereby corrected as shown below:

In the heading of the patent, line 2, change "Warner" to --Werner--. Column 1, line 41, change "lamp cs)" to --lamp(s)--. Column 2, line 44, after "filmholder 14." insert --The wall 26 must, of course, not hinder the path of rays between the person 24, and the filmholder 14.--. Column 3, line 12, change "18m" to --18,--. Column 4, line 14, after "photographed" delete "24"; line 21, change "146b" to --146d--.
                                        Column 8, line 6, change "than" to --that--.

Signed and sealed this 17th day of September 1974.

(SEAL)
Attest:

McCOY M. GIBSON JR.            C. MARSHALL DANN
Attesting Officer               Commissioner of Patents